US012392181B2

(12) United States Patent
Albrecht

(10) Patent No.: US 12,392,181 B2
(45) Date of Patent: Aug. 19, 2025

(54) HINGE, IN PARTICULAR FOR REFRIGERATOR DOORS

(71) Applicant: Grass GmbH, Reinheim (DE)

(72) Inventor: Markus Albrecht, Lustenau (AT)

(73) Assignee: Grass GmbH, Reinheim (DE)

( * ) Notice: Subject to any disclaimer, the term of this patent is extended or adjusted under 35 U.S.C. 154(b) by 0 days.

(21) Appl. No.: 18/810,685

(22) Filed: Aug. 21, 2024

(65) Prior Publication Data

US 2024/0410211 A1 Dec. 12, 2024

Related U.S. Application Data

(63) Continuation of application No. PCT/EP2023/078853, filed on Oct. 17, 2023.

(30) Foreign Application Priority Data

Oct. 21, 2022 (DE) ..................... 10 2022 127 874.3

(51) Int. Cl.

| | |
|---|---|
| ***E05F 1/08*** | (2006.01) |
| ***E05D 3/14*** | (2006.01) |
| ***E05F 3/20*** | (2006.01) |

(52) U.S. Cl.

CPC .................. *E05D 3/14* (2013.01); *E05F 3/20* (2013.01); *E05Y 2201/264* (2013.01);

(Continued)

(58) Field of Classification Search

CPC .... E05D 3/06; E05D 3/14; E05D 3/18; E05D 3/183; E05D 3/186; E05F 15/611;

(Continued)

(56) References Cited

U.S. PATENT DOCUMENTS

| | | | | |
|---|---|---|---|---|
| 2010/0101052 A1 | 4/2010 | Waltemate et al. | | |
| 2017/0016260 A1* | 1/2017 | Pyo | ........................... | F16F 9/19 |

(Continued)

FOREIGN PATENT DOCUMENTS

| | | |
|---|---|---|
| DE | 20 2007 004 621 U1 | 9/2008 |
| DE | 10 2008 035 926 A1 | 2/2010 |

(Continued)

OTHER PUBLICATIONS

English translation of Written Opinion of the International Searching Authority (WO/ISA) (Application No. PCT/EP2023/078853) dated Jan. 24, 2024 (3 pages).

(Continued)

*Primary Examiner* — Chuck Y Mah
(74) *Attorney, Agent, or Firm* — BURR PATENT LAW, PLLC

(57) ABSTRACT

A hinge having a fastening element attachable to a body and connected via pivot arms to a pivotable mounting element. The mounting element can be attached to a movable furniture part. The hinge has a damper which damps a closing movement of the furniture part. The damper has at one end a hook element and an immovable holding element arranged on the fastening element. The holding element has a cut-out. During closing movement of the hinge, the hook element on the damper comes into engagement with the cut-out on the holding element, whereby damping takes place. During the opening movement of the hinge and starting from the closed state of the hinge, the hook element is in engagement with the cut-out on the holding element, whereby the damper can be transferred into a use state for a damped closing movement.

14 Claims, 5 Drawing Sheets

(52) U.S. Cl.
CPC ... *E05Y 2201/266* (2013.01); *E05Y 2201/624* (2013.01); *E05Y 2900/20* (2013.01)

(58) Field of Classification Search
CPC ...... E05F 15/614; E05F 3/20; E05Y 2201/43; E05Y 2201/434; E05Y 2201/456; E05Y 2600/46; E05Y 2600/52; E05Y 2600/522; E05Y 2600/528; E05Y 2600/53; E05Y 2600/56; E05Y 2201/264; E05Y 2201/266
See application file for complete search history.

(56) References Cited

U.S. PATENT DOCUMENTS

| | | | | |
|---|---|---|---|---|
| 2019/0383081 | A1* | 12/2019 | Thielmann | E05D 11/0054 |
| 2021/0054670 | A1 | 2/2021 | Lee | |
| 2021/0238902 | A1* | 8/2021 | Byun | E05F 3/20 |
| 2021/0270071 | A1* | 9/2021 | Salice | E05F 5/006 |
| 2021/0364223 | A1 | 11/2021 | Oh et al. | |
| 2022/0034577 | A1* | 2/2022 | Oh | F25D 23/028 |
| 2023/0383584 | A1* | 11/2023 | Schneider | E05D 3/16 |
| 2024/0018814 | A1* | 1/2024 | Danijel | E05F 5/006 |
| 2024/0318484 | A1* | 9/2024 | Schuler | E05F 1/1215 |
| 2024/0328227 | A1* | 10/2024 | Holzapfel | E05D 3/142 |

FOREIGN PATENT DOCUMENTS

| | | | |
|---|---|---|---|
| DE | 10 2009 000 843 | A1 | 8/2010 |
| KR | 10-2020-0077890 | A | 7/2020 |
| KR | 10-2187424 | B1 | 12/2020 |

OTHER PUBLICATIONS

German Search Report (Application No. 10 2022 127 874.3) dated Feb. 13, 2023 (6 pages).
International Search Report and Written Opinion (Application No. PCT/EP2023/078853) dated Jan. 24, 2024 (11 pages).

* cited by examiner

HINGE, IN PARTICULAR FOR REFRIGERATOR DOORS

CROSS REFERENCE TO RELATED APPLICATIONS

This application is a continuation of International Application No. PCT/EP2023/078853 filed Oct. 17, 2023, which designated the United States, and claims the benefit under 35 USC § 119(a)-(d) of German Application No. 10 2022 127 874.3 filed Oct. 21, 2022, the entireties of which are incorporated herein by reference.

FIELD OF THE INVENTION

The present invention relates to a hinge, in particular for refrigerator doors.

BACKGROUND OF THE INVENTION

Hinges for household appliances are already known, wherein the damper acts only during the closing movement of the movable furniture part, in particular, a refrigerator door. In the known hinges, the action of the damper is implemented by means of a pivotable element. Dampers which can be used again immediately after opening from the closed state are also known.

SUMMARY OF THE INVENTION

The object of the present invention is to provide an improved hinge for household appliances, in particular, regarding a compact and simple design.

The present invention is based on a hinge, in particular, for refrigerator doors, having a fastening element which can be attached to the body and which is connected via a plurality of pivot arms to a pivotable mounting element, wherein the mounting element can be attached to a movable furniture part, wherein the hinge has a damper which damps a closing movement of the movable furniture part.

Preferably, the movable furniture part is designed as a refrigerator door, wherein, for example, the hinge is connected via the mounting element to the movable furniture part or the refrigerator door. For example, openings or through-holes, for example, through-bores or screw receivers or receivers for screwing means, are present on the mounting element, so that the mounting element can be reliably but fixedly attached to the movable furniture part by means of a fastening mechanism, such as, for example, a screwing mechanism. At the same time, a fastening mechanism engages through the through-hole and into a material region of the movable furniture part. The mounting element is configured, for example, as a flange.

Furthermore, a pivot arm is preferably arranged on the mounting element, wherein the pivot arm has, for example, two pivot pins. It is also conceivable that the mounting element and the pivot arm are configured in one piece.

The fastening element is releasably but fixedly connected to the body, for example. To this end, the fastening element has, for example, openings or through-holes, for example, through-bores or screw receivers or receivers for a screwing mechanism, into which a fastening mechanism, for example, a screwing mechanism, can engage. At the same time a fastening mechanism engages through the through-hole in the fastening element and into a material region of the body.

The fastening element is, for example, an L-shaped profile, wherein the L-shaped profile has a short limb and a long limb. For example, a lateral cover which covers parts of the hinge is present between the short and long limbs. For example, parts of the hinge are permanently covered by the lateral cover. For example, two pivot pins are configured on the lateral cover, wherein a pivot arm is arranged on each pivot pin.

In the closed state of the hinge, for example, the fastening element and the mounting element form a U-shape in cross section.

The hinge is configured, for example, as a multi-joint hinge. The hinge has, for example, five pivot arms and nine pivot pins. For example, the plurality of pivot pins of the pivot arm or the pivot arms are oriented parallel to one another.

The damper is configured, for example, as a linear damper. The damper preferably has a cylinder housing and a piston rod. The piston rod is moved, for example, into and out of the cylinder housing during the opening and closing movement of the hinge.

The essential idea of the present invention is that the damper has a hook element at one end, wherein an immovable holding element is arranged on the fastening element, wherein the holding element has a cut-out, wherein during the closing movement of the hinge the hook element on the damper comes into engagement with the cut-out on the holding element, whereby the damping action takes place, wherein the hinge is designed such that, during the opening movement of the hinge and starting from the closed state of the hinge, the hook element is in engagement with the cut-out on the holding element, whereby the damper can be transferred into a use state for a damped closing movement.

The hook element is arranged, for example, on the cylinder housing of the damper. The hook element is fixedly connected, for example, to the cylinder housing of the damper. It is conceivable that the hook element and the cylinder housing of the damper are configured in one piece. Moreover, the hook element and the cylinder housing in each case can be a separate component. For example, during the movement of the damper the hook element is moved therewith until the hook element engages in the cut-out on the holding element. The hook element has, for example, a hook portion which during the closing movement of the hinge engages in the cut-out on the holding element. For example, after the hook portion has engaged in the cut-out on the holding element, the piston rod can be retracted into the cylinder housing, whereby the damping action occurs.

In the closed state of the hinge, the hook element is preferably engaged in the cut-out on the holding element, whereby the damper can be moved back into the use state so that the subsequent closing movement of the hinge can be damped again immediately after the opening thereof. For the use state, for example, the piston rod is initially pulled out of the cylinder housing by the pivoting movement of the hinge. This is possible since the hook element is preferably still secured in the cut-out on the holding element. Advantageously, a separation of the hook element and the cut-out on the holding element takes place from a specific degree of opening. During the further opening movement of the hinge, for example, the damper is pivoted unchanged further in the opening direction. For example, in the damper, the piston rod is pulled out of the cylinder housing. This is advantageous since the damper can be used again after a small opening angle of the hinge, in order to damp a closing movement of the movable furniture part.

For example, the holding element is arranged on the fastening element, in particular, on the short limb of the fastening element. The holding element is fixedly connected, for example, to the fastening element. It is also conceivable that the holding element and the fastening element are configured in one piece.

For example, the holding element has a cut-out, wherein the cut-out is designed, for example, as an elongated depression.

For example, the damper is designed such that the damper is guided in a linear manner in a first pivot arm.

For example, a pivotable additional element is configured on the damper, during the pivoting movement of the hinge the additional element being able to be pivoted therewith. The additional element is designed, for example, such that during the pivoting movement of the hinge, the damper is guided in a linear manner relative to the first pivot arm. The additional element is pivotably received, for example, on the fastening element. It is also conceivable that the additional element and the first pivot arm are configured in one piece. Preferably, the damper is present so as to be movable relative to the additional part.

For example, the damper is designed such that the damper is pivotably guided in the first pivot arm.

For example, the first pivot arm has three pivot pins, wherein a second pivot arm is arranged on a pivot pin. For example, one end of the damper is arranged on the second pivot arm, wherein a piston rod of the damper is preferably connected to the second pivot arm. During the pivoting movement of the hinge, for example, the damper is pivoted together with the first and second pivot arm, wherein the first pivot arm can be moved relative to the second pivot arm.

For example, the damper has a guide element which is guided in a guide track on the first pivot arm.

The guide element is designed, for example, as a protruding pin and has, for example, a circular cross section. The guide element is configured, for example, on the hook element of the damper, wherein the guide element is preferably arranged on two opposing sides of the hook element of the damper. The guide element or the guide elements is or are held, for example, in the guide track on the first pivot arm. Preferably, guide tracks are designed on the two opposing sides of the first pivot arm. The first pivot arm is designed, for example, to be U-shaped, wherein the first pivot arm has a connecting part and two side parts. The connecting part preferably connects the two side parts together.

For example, in each case a guide track is configured in a side part of the first pivot arm. For example, a guide element is held in the one guide track on the first side part of the first pivot arm, and the other guide element is held in a guide track on the second side part of the first pivot arm.

The guide track is preferably designed as a slotted guide. The guide track or the slotted guide can be designed to be curved or semi-circular or linear. For example, the guide track is designed to be curved when the damper is pivotably guided in the first pivot arm. It is also conceivable that the guide track is designed to be linear, in particular, when the damper is guided in a linear manner in the first pivot arm.

For example, in the open state of the hinge the guide element is arranged at one end of the guide track, wherein during the closing movement of the hinge, for example, the guide element is moved along the guide track. During a further pivoting of the hinge in the closing direction, for example, the hook element engages in the cut-out on the holding element, whereby the guide element is moved, for example, in the opposing direction along the guide track. When the hook element has engaged in the indentation, the guide element remains at the same location, for example, wherein during the closing movement the guide track or the first pivot arm is pivoted further and thus the guide element is moved along the guide track.

For example, the cut-out on the holding element is adapted to the hook element.

The cut-out is configured, for example, to be recessed in the holding element, wherein the cut-out is configured to be elongated. The opening of the elongated depression in the holding element is preferably oriented in the direction of the long limb of the fastening element.

Preferably, the hook portion of the hook element can engage in the elongated depression of the cut-out. The hook portion is designed, for example, to be hook-shaped.

For example, the hook element is freely movable until it is latched in the cut-out on the holding element.

The hook element, in particular, is freely movable from the open state until a closing range of 70° to 50° is reached.

For example, during the opening and closing movement of the hinge the hook element is pivoted together with the damper when the hook element is not latched in the cut-out on the holding element.

Preferably, during the opening and closing movement of the hinge the hook element and the damper are pivoted together with the first pivot arm and the second pivot arm, wherein the first pivot arm is pivoted about a pivot pin which is arranged on the fastening element. For example, the first pivot arm and the second pivot arm are connected together by means of a pivot pin. A further pivot pin is present on the second pivot arm, for example, wherein preferably the damper is connected to this pivot pin.

For example, the damper deploys its action from a closing range of 60°.

For example, the damper deploys its action from a closing range of 65°, of 60°, of 55° and of 50°.

During the opening movement and starting from the closed state of the hinge, the cylinder housing is secured, for example, by the hook element being latched in the cut-out on the holding element, wherein the piston rod is moved out of the cylinder housing, for example, by the pivoting of the first pivot arm and thus the piston rod. For example, the hook element is moved out of the cut-out on the holding element only after the piston rod has been moved completely out of the cylinder housing. For example, the damper, in which the piston rod is completely pulled out of the cylinder housing, is pivoted during a further opening movement of the hinge.

The action of the damper is deployed during the closing movement of the hinge, for example, by the hook element, in particular, the hook portion, engaging in the cut-out on the holding element, which is preferably fixedly attached to the fastening element. For example, after the hook element engages in the cut-out on the holding element, the piston rod of the damper is pushed into the cylinder housing of the damper, whereby the damper deploys its action. Advantageously, during the closing movement of the hinge, the first pivot arm and thus also the piston rod are pivoted, wherein the cylinder housing of the damper is fixedly held since the hook element engages in the cut-out. Thus, the piston rod is moved into the cylinder housing.

For example, three pivot pins are arranged on the first pivot arm, wherein a first pivot pin is arranged on the fastening element.

The first pivot pin is preferably arranged at one end of the first pivot arm. For example, the fastening element has exactly two lateral covers, wherein in each case a lateral cover extends between the short and long limbs of the fastening element. Preferably, the lateral cover is designed to be planar. For example, the first pivot pin extends between the lateral covers of the fastening element, wherein the first pivot pin runs, for example, perpendicularly to a main plane of the lateral cover. The main plane is spanned, for example, between the long and short limbs of the fastening element.

For example, a first bearing element, which is configured for example as a bolt or pin, is arranged between the two lateral covers of the fastening element and the side parts of the first pivot arm. The first bearing element is designed, for example, to be cylindrical. The first pivot pin runs, for example, along the longitudinal extent of the first bearing element. The first bearing element preferably adjoins the holding element. A semi-circular recess, in which a part of the first bearing element is received, is preferably present on the holding element.

For example, the first pivot arm is connected to one end of a force unit by means of a second pivot pin.

For example, the second pivot pin is arranged at one end of the first pivot arm, wherein the second pivot pin is arranged at an end opposing the first pivot pin.

The second pivot pin is preferably oriented parallel to the first pivot pin. For example, a second bearing element, which is configured as a bolt or pin for example, is arranged between the two side parts of the first pivot arm. The second bearing element is designed, for example, to be cylindrical. The second pivot pin runs, for example, along the longitudinal extent of the second bearing element.

For example, the force unit is configured as a spring unit, such as, for example, a helical spring or a compression spring. Preferably, one end of the force unit is arranged on the second bearing element.

For example, the first pivot arm is connected by means of a third pivot pin to a second pivot arm, wherein an end of the damper opposing the hook element is arranged on the second pivot arm.

For example, the third pivot pin is oriented parallel to the first and second pivot pin. Preferably, all of the pivot pins are oriented parallel to one another. For example, the third pivot pin is arranged between the first and second pivot pin on the first pivot arm.

For example, a third bearing element, which is configured for example as a bolt or pin, is arranged between the two side parts of the first pivot arm. The third bearing element is designed, for example, to be cylindrical. The third pivot pin runs, for example, along the longitudinal extent of the third bearing element. For example, one end of the second pivot arm is connected to the third bearing element, wherein a part of the third pivot arm can be received, for example, in the internal volume of the first pivot arm. The internal volume of the first pivot arm is defined by the side parts and the connecting part of the first pivot arm.

The second pivot arm has, for example, four pivot pins. The four pivot pins of the second pivot arm are oriented, for example, parallel to one another. Moreover, the four pivot pins of the second pivot arm are oriented, for example, parallel to the three pivot pins of the first pivot arm.

For example, one end of the damper, in particular, the piston rod of the damper, is arranged on a pivot pin of the second pivot arm. For example, the piston rod of the damper can be moved relative to the cylinder housing of the damper by the pivoting movement of the hinge, in particular, by the relative movement of the first and second pivot arms, in particular, when the hook element engages in the indentation on the holding element.

For example, a third pivot arm is connected to the mounting element by means of a pivot pin, wherein a curved element with an indentation is attached to the pivot pin.

For example, the third pivot arm has three pivot pins, wherein the pivot pins are oriented parallel to one another on the third pivot arm. For example, the pivot pins on the third pivot arm are oriented parallel to the pivot pins on the first pivot arm. For example, the pivot pins on the third pivot arm are oriented parallel to the pivot pins on the second pivot arm. For example, two pivot pins are arranged on the third pivot arm at the end regions of the third pivot arm. Preferably, the third pivot arm is connected to the first pivot arm by means of the second pivot pin, which is configured at a first end of the third pivot arm. The second end of the third pivot arm is connected, for example, by means of a fourth pivot pin to the mounting element or a pivot arm arranged on the mounting element.

The pivot arm arranged on the mounting element is configured, for example, in a U-shaped manner, wherein the pivot arm has, for example two side parts and a central part. For example, in the closed state of the hinge only the first pivot arm and the pivot arm on the mounting element are visible from the outside.

Preferably, parts of the hinge are received in the internal volume of the first pivot arm and in the internal volume of the pivot arm on the mounting element.

Preferably, a fourth bearing element is arranged between the side parts of the pivot arm on the mounting element, wherein the longitudinal extent of the fourth bearing element runs along the fourth pivot pin.

For example, the curved element is arranged on the fourth bearing element. For example, the curved element has a curved guide, wherein the curved guide corresponds, for example, to the outer contour of the curved element.

For example, a pivot plate is arranged on the third pivot arm, wherein a counter element is attached to the pivot plate, wherein the counter element is of circular design.

For example, the pivot pin, on which the pivot plate is arranged, is configured centrally on the third pivot arm.

The counter element is configured, for example, as a ball or roller, or has a circular outer contour. The pivot plate is preferably configured to be triangular. For example, the counter element is arranged on a first corner of the pivot plate, an end of the force unit is arranged on a second corner, and the pivot pin which connects the pivot plate to the third pivot arm is arranged on the third corner. For example, the pivot plate can be pivoted about the pivot pin during the opening and closing movement of the hinge.

For example, during the opening and closing movement of the hinge the counter element bears continuously against the curved guide of the curved element. Preferably, the indentation on the curved element is adapted to the counter element, in particular, to the outer contour of the curved element.

For example, in the closed position of the hinge, the counter element is latched in the indentation on the curved element.

For example, the indentation on the curved element is designed such that the counter element can be moved out of the indentation only by the application of force. Preferably, the counter element is pushed by the force unit continuously against the curved element or the curved guide of the curved element. For example, in the closed state of the hinge, the counter element is pushed against the indentation on the curved element.

The indentation is configured, for example, as a concave recess in the curved element.

For example, the curved element has a convex region, wherein during the closing movement of the hinge the counter element bears against the convex region of the curved element.

For example, the convex region of the curved element is oriented toward the second pivot arm. For example, in the completely open state of the hinge, the counter element bears against the convex region of the curved element which is located in a corner region between the start of the convex region of the curved element and the mounting element. During the opening movement of the hinge, the counter element is moved along the convex region of the curved element until the counter element reaches a top point of the curved element. At the top point of the curved element, for example, the concave indentation of the curved element and the convex region of the curved element adjoin one another.

The present invention also relates to an item of furniture or household appliance having a body and a movable furniture part which is received so as to be movable on the body, wherein a hinge according to one of the above-described embodiments is provided for moving the movable furniture part. The discussed features and advantages can thus be achieved in an item of furniture or household appliance, such as, for example, a refrigerator.

BRIEF DESCRIPTION OF THE DRAWINGS

Further features and advantages of the present invention are explained in more detail with reference to an exemplary embodiment shown schematically in the figures.

DETAILED DESCRIPTION OF THE INVENTION

Figure 1:
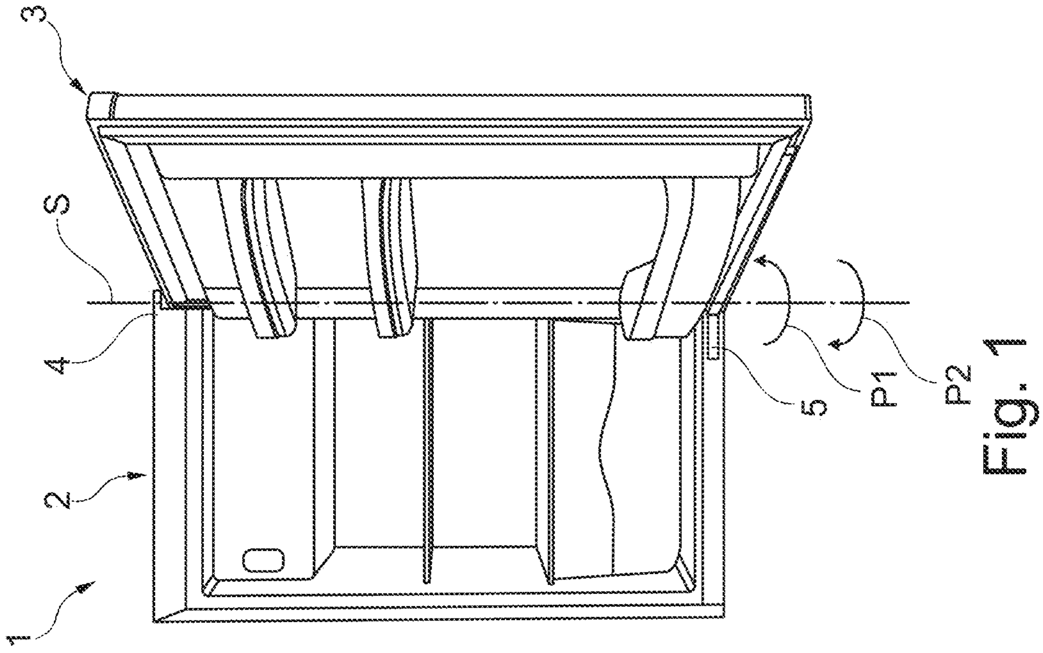
FIG. 1 shows a schematically represented household appliance in a perspective view from the front with a movable furniture part which is received thereon so as to be movable via a hinge in the open position relative to a body of the household appliance.

FIG. 1 shows schematically a household appliance 1, by way of example a refrigerator, having a body 2 and a movable furniture part 3 which is received on the body 2 and which in the exemplary embodiment forms a refrigerator door of the refrigerator. A hinge 4 is provided on the household appliance 1 for moving the movable furniture part 3 relative to the body 2 in an opening direction P1 and in a closing direction P2. The movable furniture part 3 is attached by way of example to the household appliance 1 on the right. A hinge 5 corresponding to the hinge 4 acts at the bottom on the right-hand side on the household appliance 1 between the body 2 and the movable furniture part 3.

The two hinges 4, 5 form a bearing for the movement or pivoting of the movable furniture part 3 on the body 2. The two hinges 4, 5 are preferably present in each case between the body 2 and the movable furniture part 3 such that in the installed state of the household appliance 1, a common perpendicular or vertical pivot axis S, about which the movable furniture part 3 can be pivoted to and fro relative to the body 2 in the directions P1 and P2, is formed by both hinges 4, 5. The movable furniture part 3 can be pivoted or opened from a closed position on the body 2, with a pivoting angle between a front vertical flat side of the body 2 and a vertical internal or external flat side of the movable furniture part 3 from 0 angular degrees to approximately 115 angular degrees, in the direction P1 relative to the body 2. FIGS. 3 to 10 show the hinge 4 or 5 successively opening further into its various folded-open positions without the body 2 and without the movable furniture part 3.

Figure 2:
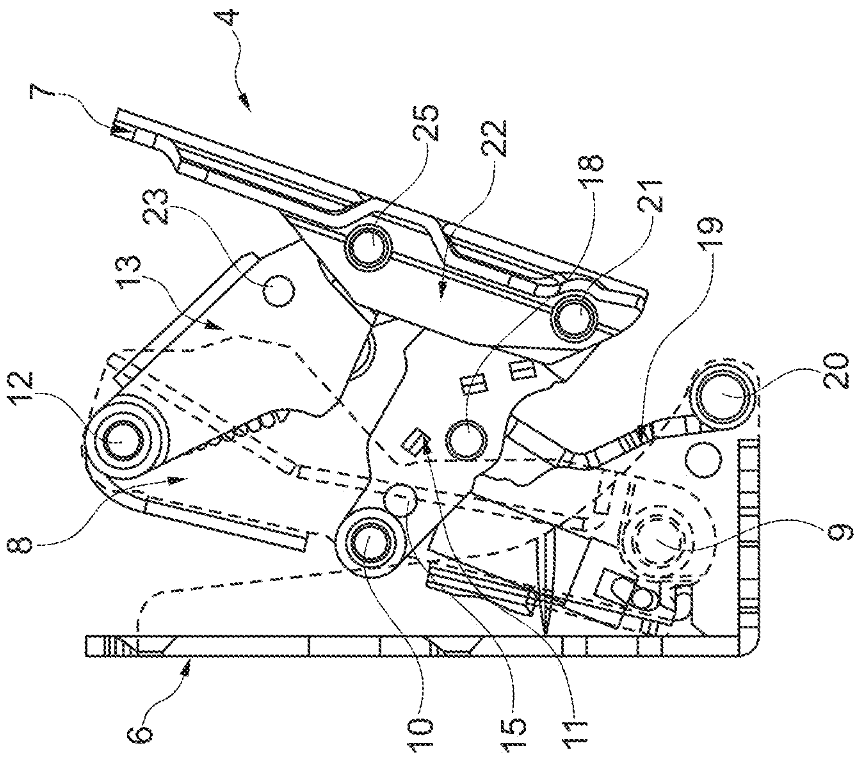
FIG. 2 shows a perspective view from the front of a hinge according to the present invention according to FIG. 1, wherein a fastening element and a pivot arm are represented in a transparent manner.

In FIG. 2 the hinge 4 or 5, which is designed as a multijoint hinge, is shown in more detail, wherein parts of a fastening element 6 and a pivot arm 8 are shown in a transparent manner in order to obtain a view of other parts of the hinge 4, 5.

The hinge 4, 5, for example, can be releasably attached by means of a mounting element 7 to the movable furniture part 3 and by means of the fastening element 6 to the body 2, by a fastening mechanism, not shown, such as, for example, a screwing mechanism. The mounting element 7 is preferably connected via a plurality of pivot arms 8, 11, 13, 19, 22 to the fastening element 6. The fastening element 6 is preferably L-shaped and has, for example, a long limb 35 and a short limb 36. For example, a lateral cover 37 is present between the long 35 and short 36 limbs of the fastening element 6.

A first pivot arm 8, for example, is designed to be U-shaped, wherein the pivot arm preferably has a connecting part and two side parts. The connecting part connects, for example, the two side parts together. The first pivot arm 8 preferably has three pivot pins 9, 10, 12. The first pivot arm 8 is connected, for example, by means of a first pivot pin 9 to the fastening element 6, by means of a third pivot pin 10 to a second pivot arm 11 and by means of a second pivot pin 12 to a third pivot arm 13. The first pivot arm 8 is connected, for example, by means of a third bearing element 40 to the second pivot arm 11. Preferably, the longitudinal extent of the third bearing element 40 runs along the third pivot pin 10.

For example, the first pivot arm 8 is connected by means of a first bearing element 38 to the fastening element 6. Preferably, the longitudinal extent of the first bearing element 38 runs along the first pivot pin 9. For example, the first bearing element 38 extends between the side parts of the first pivot arm 8.

One end of a force unit 14 is arranged on the second pivot pin 12 of the first pivot arm 8, wherein the force unit 14 is preferably configured as a compression spring. For example, the end of the force unit 14 is connected to a second bearing element 39, wherein the second bearing element 39 is arranged, for example, between the side parts of the first pivot arm 8.

The second pivot arm 11 has, for example, four pivot pins 10, 15, 18, 21, wherein an end of a damper 16, for example, a free end of a piston rod 17 of the damper 16, is attached to a fifth pivot pin 15 of the second pivot arm 11. A fourth pivot arm 19 is preferably attached to the second pivot arm 11 on a sixth pivot pin 18, wherein the fourth pivot arm 19 is connected, for example, via a seventh pivot pin 20 to the fastening element 6. The second pivot arm 11 is connected, for example, by means of an eighth pivot pin 21 to a fifth pivot arm 22, wherein the fifth pivot arm 22 is preferably directly attached to the mounting element 7. It is also conceivable that the fifth pivot arm 22 and the mounting element 7 are configured as one component. The fifth pivot arm 22, for example, is of U-shaped configuration, wherein the fifth pivot arm 22 preferably has a central part and two side parts. Preferably, the central part connects the two side parts together. For example, a fourth bearing element 41 extends between the side parts of the fifth pivot arm 22.

The third pivot arm 13 has, for example, three pivot pins 12, 23, 25, wherein a pivot plate 24, which is configured to be triangular, for example, is arranged on a ninth pivot pin 23. A fourth pivot pin 25 connects, for example, the third pivot arm 13 to the fifth pivot arm 22 or the mounting element 7. On the pivot plate 24, for example, the other end of the force unit 14 is arranged on one corner, a counter element 26 is arranged on a second corner and the ninth pivot pin 23 is arranged on the third corner (see FIG. 4). The counter element 26 is preferably designed to be circular in cross section and can be configured, for example, as a ball or cylinder. The counter element 26, for example, continuously bears against a curved element 27 which is arranged, for example, on the fourth pivot pin 25 or the fourth bearing element 41. During the opening and closing movement of the hinge 4, 5, the curved element 27 is pivoted, for example, together with the mounting element 7 or the movable furniture part 3. The curved element 27 has, for example, a curved guide 42 which preferably corresponds to the outer contour of the curved element 27 against which the counter element 26 bears. The counter element 26 preferably continuously bears against the curved guide 42 of the curved element 27.

For example, a holding element 28 is attached to the fastening element 6, wherein the holding element 28 is fixedly connected to the fastening element 6. It is also conceivable that the holding element 28 is configured in one piece with the fastening element 6. The holding element 28 has, for example, a cut-out 29. The cut-out 29 is preferably configured to be recessed in the holding element 28. Preferably, a hook element 30 engages temporarily in the cut-out 29 of the holding element 28, in particular, in a closing range of 0°-60°. The cut-out 29 on the holding element 28 is adapted, for example, to the outer contour of the hook element 30. The hook element 30 is preferably arranged on a second end of the damper 16, in particular, on a cylinder housing 31 of the damper 16. Furthermore, the damper 16, in particular, the hook element 30 on the damper 16, preferably has a guide element 32 which is held guided in a guide track 33 on the first pivot arm 8. The guide element 32 is preferably designed as a pin and the guide track 33 as a slotted guide.

Figure 8:
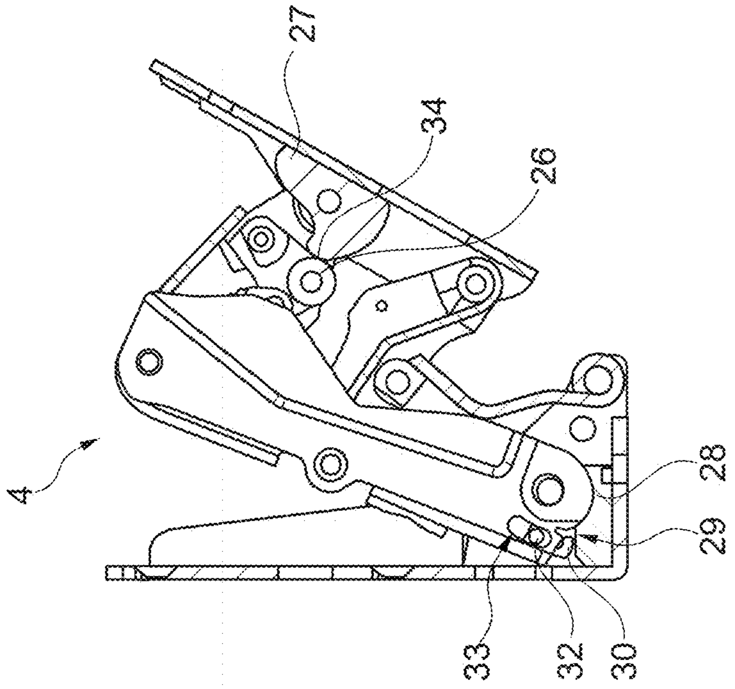
Figure 7:
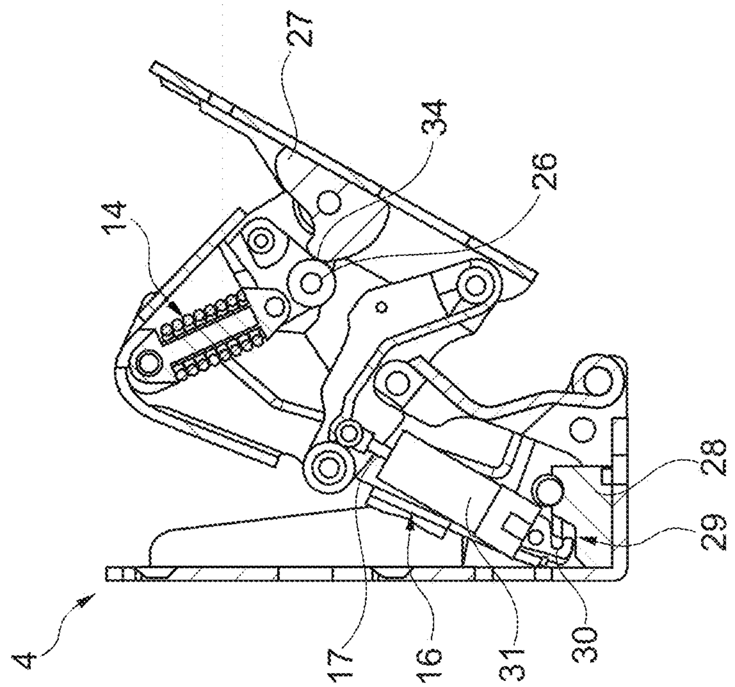
Figure 9:
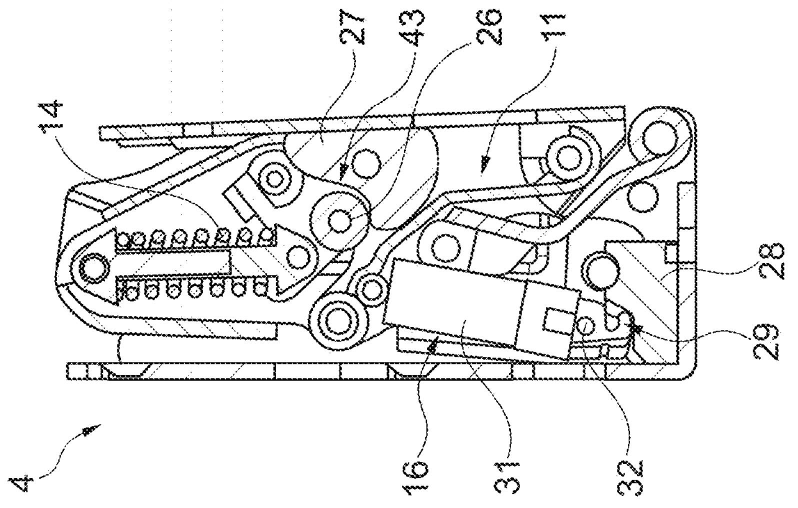
FIGS. 9-10 show the hinge from the front according to FIGS. 3 to 8 in the completely closed state.
Figure 10:
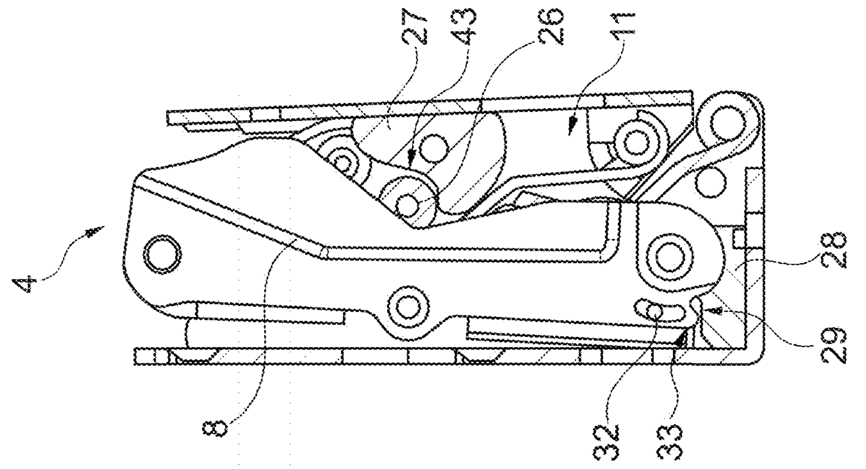

If the hinge 4, 5 is moved from the closed position (see FIGS. 9 and 10) in the opening direction P1, for example, the piston rod 17 is initially pulled out of the cylinder housing 31 of the damper 16 (see FIGS. 7 and 8). This is possible since the hook element 30 engages in the cut-out 29 on the holding element 28, for example. During a further pivoting of the hinge 4, 5 in the opening direction P1, the hook element 30 is moved, for example, out of the cut-out 29 on the holding element 28, whereby the hook element 30 or the damper 16 can be freely moved (see FIGS. 3 to 6). The damper 16 is fully tensioned or the piston rod 17 is completely pulled out of the cylinder housing 31, so that the damper 16 would be immediately usable again at any time during a closing movement of the hinge 4, 5.

Moreover, the guide element 32 is moved, for example, from a first end region of the guide track 33 (see FIG. 10) to the opposing end region of the guide track 33 (see FIG. 8). This is because, due to the engagement of the hook element 30 in the cut-out 29 on the holding element 28, the cylinder housing 31 of the damper 16 is secured, for example, but the first pivot arm 8 or the guide track 33 is pivoted during the opening movement. During a further movement in the opening direction P1, both the guide element 32 and the guide track 33 are pivoted, wherein the guide element 32 is moved relative to the guide track 33 and as a result the guide element 32 passes back into the first end region of the guide track 33 (see FIGS. 4 and 6).

Figure 4:
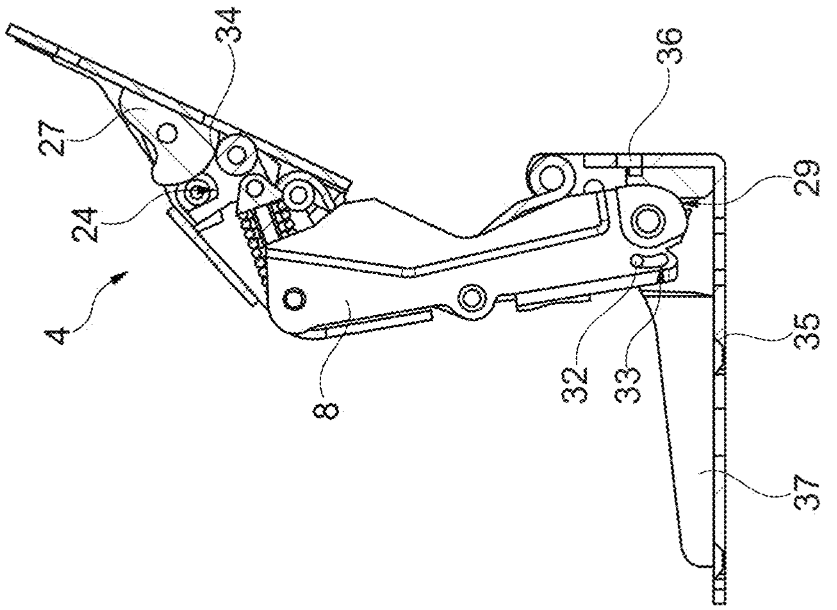
FIG. 4 shows the hinge according to FIG. 3, wherein a pivot arm is not represented in a transparent manner.
Figure 3:
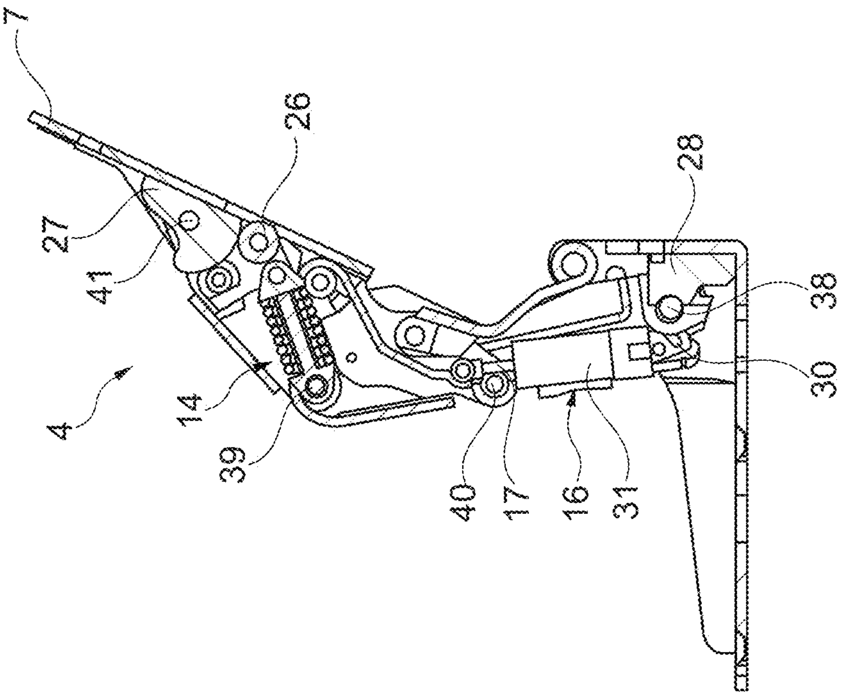
FIG. 3 shows the hinge from the front according to FIG. 2 in the completely open state, wherein the pivot arms are represented in a transparent manner.
Figure 5:
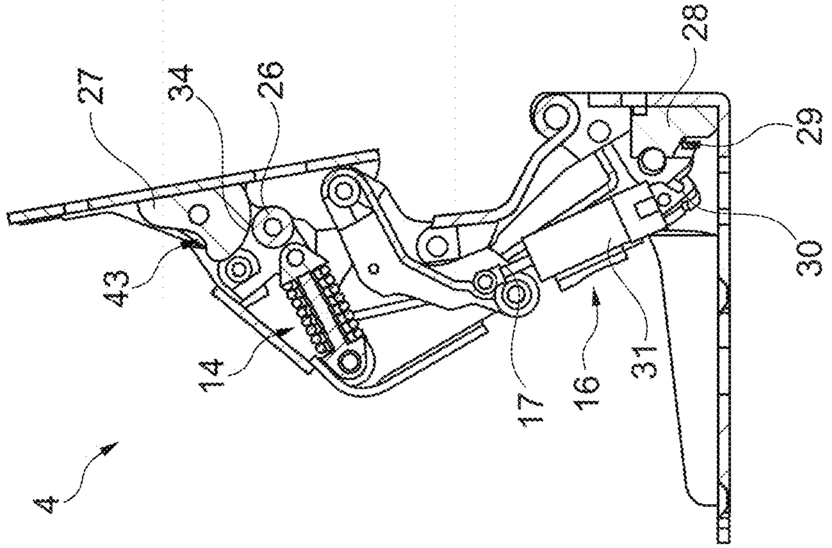
FIGS. 5-8 show the hinge from the front according to FIGS. 3 and 4 in different pivoted states.
Figure 6:
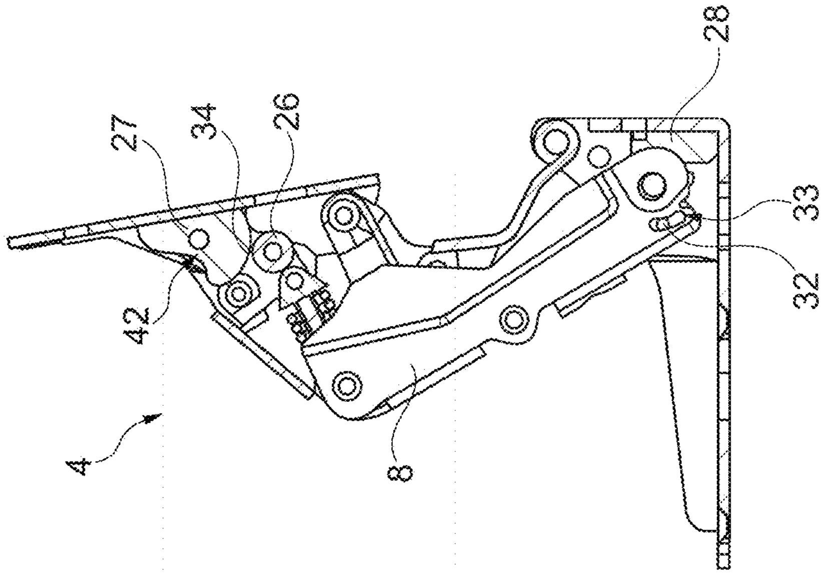

During the opening movement of the hinge 4, 5, the counter element 26 is moved, for example, from the indentation 43 on the curved element 27 (see FIG. 9) along the convex region 34 of the curved element 27 (see FIGS. 5-8) until the counter element 26 reaches the convex region 34 of the curved element 27 adjacent to the mounting element 7 (see FIGS. 3 and 4).

In FIGS. 3 and 4, the hinge 4, 5 is shown in the completely open position with an opening angle of 115°. In the completely open position, the counter element 26 bears, for example, against a convex region 34 of the curved element 27 and against the mounting element 7. The force unit 14 is preferably tensioned and pushes the counter element 26 against the curved element 27 or the curved guide 42 of the curved element 27. The guide element 32 on the hook element 30 bears, for example, against an end region of the guide track 33 (see FIG. 4). The piston rod 17 on the damper 16 is completely pulled out of the cylinder housing 31 of the damper 16, for example.

During the closing movement of the hinge 4, 5 or the movable furniture part 3, for example, the pivot arms 8, 11, 13, 19, 22 are pivoted about the pivot pins 9, 10, 12, 15, 18, 20, 21, 23, 25. At the same time, the counter element 26, for example, is moved along the convex region 34 on the curved element 27 away from the mounting element 7 (see FIGS. 5 and 6). During the movement of the counter element 26 on the curved element 27, for example, the pivot plate 24 is pivoted about the eighth pivot pin 23, wherein the force unit 14 continues to be tensioned. During the pivoting movement of the hinge 4, 5 in the closing direction P2, the damper 16 is pivoted unchanged, for example, wherein the hook element 30 or the damper 16 is freely movable and the piston rod 17 continues to be pulled completely out of the cylinder housing 31. The guide element 32 is moved, for example, from the end region of the guide track 33 (see FIG. 4) slightly along the guide track 33 (see FIG. 6) as far as the other end region of the guide track 33 (see FIG. 8).

During the further closing movement of the hinge 4, 5 (see FIGS. 7 and 8), for example, the counter element 26 is moved further along the convex region 34 of the curved element 27. Preferably, the force unit 14 is slowly relaxed, whereby a torque is produced between the mounting element 7 and the fastening element 6, which assists the closing movement of the mounting element 7 or the movable furniture part 3. For example, due to the pivoting movement of the hinge 4, 5 the hook element 30 passes into the cut-out 29 on the holding element 28, whereby the cylinder housing 31 of the damper 16 is fixedly held. The guide element 32 on the hook element 30 is also fixedly held, for example, by the engagement of the hook element 30 in the cut-out 29 on the holding element 28.

If the hinge 4, 5 is pivoted further into the closed state (see FIGS. 9, 10), for example, the counter element 26 passes from the convex region 34 of the curved element 27 to the concave region or an indentation 43 on the curved element 27. The force unit 14, for example, is still slightly tensioned, whereby a small torque still acts in the closing direction P2 on the mounting element 7. The hook element 30 continues to engage in the cut-out 29 on the holding element 28, for example, wherein due to the pivoting movement of the hinge 4, 5 or the second pivot arm 11, the piston rod 17 is preferably retracted into the cylinder housing 31 of the damper 16 until the piston rod 17 cannot be pushed further into the cylinder housing 31 (see FIG. 9). This results, for example, in the damping action. This preferably takes place from a closing range of 60° (see FIG. 8). Moreover, the guide track 33 on the first pivot arm 8 is pivoted, for example, during the pivoting movement of the hinge 4, 5 in the closing direction P2, starting from FIG. 8, whereby the guide element 32 is moved along the guide track 33 to an end region of the guide track 33 (see FIG. 10).

LIST OF REFERENCE SIGNS

1 Household appliance
2 Body
3 Furniture part
4 Hinge
5 Hinge
6 Fastening element
7 Mounting element
8 Pivot arm
9 Pivot pin
10 Pivot pin
11 Pivot arm
12 Pivot pin
13 Pivot arm
14 Force unit
15 Pivot pin
16 Damper
17 Piston rod
18 Pivot pin
19 Pivot arm
20 Pivot pin
21 Pivot pin
22 Pivot arm
23 Pivot pin
24 Pivot plate
25 Pivot pin
26 Counter element
27 Curved element
28 Holding element
29 Cut-out
30 Hook element
31 Cylinder housing
32 Guide element
33 Guide track
34 Region
35 Limb
36 Limb
37 Cover
38 Bearing element
39 Bearing element
40 Bearing element
41 Bearing element
42 Curved guide
43 Indentation

The invention claimed is:

1. A refrigerator door hinge having a fastening element which can be attached to a furniture body, and which is connected via a plurality of pivot arms to a pivotable mounting element, wherein the mounting element can be attached to a movable furniture part, wherein the hinge has a damper which exerts a damping action to damp a closing movement of the movable furniture part, wherein the damper has a hook element at one end, wherein an immovable holding element is arranged on the fastening element, wherein the holding element has a cut-out, wherein during the closing movement of the hinge from an open state to a closed state, a portion of the hook element on the damper engages a corresponding portion of the cut-out on the holding element, activating the damping action, and wherein during an opening movement of the hinge from the closed state to the open state, the portion of the hook element disengages from the corresponding portion of the cut-out on the holding element, whereby the damper is available for activation.

2. The hinge as claimed in claim 1, wherein the damper is guided in a linear manner in a first pivot arm.

3. The hinge as claimed in claim 2, wherein the damper is pivotably guided in the first pivot arm.

4. The hinge as claimed in claim 2, wherein the damper has a guide element which is guided in a guide track on the first pivot arm.

5. The hinge as claimed in claim 2, further comprising three pivot pins arranged on the first pivot arm, wherein a first pivot pin is arranged on the fastening element.

6. The hinge as claimed in claim 5, wherein the first pivot arm is connected to one end of a force unit by means of a second pivot pin.

7. The hinge as claimed in claim 5, wherein the first pivot arm is connected by means of a third pivot pin to a second pivot arm, and wherein an end of the damper opposing the hook element is arranged on the second pivot arm.

8. The hinge as claimed in claim 1, wherein the hook element is freely movable until the portion of the hook element is latched into engage the corresponding portion of the cut-out on the holding element.

9. The hinge as claimed in claim 1, wherein the damping action activates during the closing movement when the hinge reaches a closing angle of 60°.

10. The hinge as claimed in claim 1, wherein a third pivot arm is connected to the mounting element by means of a pivot pin, and wherein a curved element with an indentation is attached to the pivot pin.

11. The hinge as claimed in claim 10, further comprising a pivot plate arranged on the third pivot arm, and wherein a counter element is attached to the pivot plate, wherein the counter element is of circular design.

12. The hinge as claimed in claim 11, wherein in the closed state of the hinge, the counter element is latched in the indentation on the curved element.

13. The hinge as claimed in claim 11, wherein the curved element has a convex region, and wherein during the closing movement of the hinge, the counter element bears against the convex region of the curved element.

14. An item of furniture or household appliance having a body, a movable furniture part which is received so as to be-movable on the body, and the hinge as claimed in claim 1.

* * * * *